No. 844,919. PATENTED FEB. 19, 1907.
J. E. BRUNDIN.
BEDBUG TRAP.
APPLICATION FILED APR. 22, 1905. RENEWED JAN. 10, 1907.
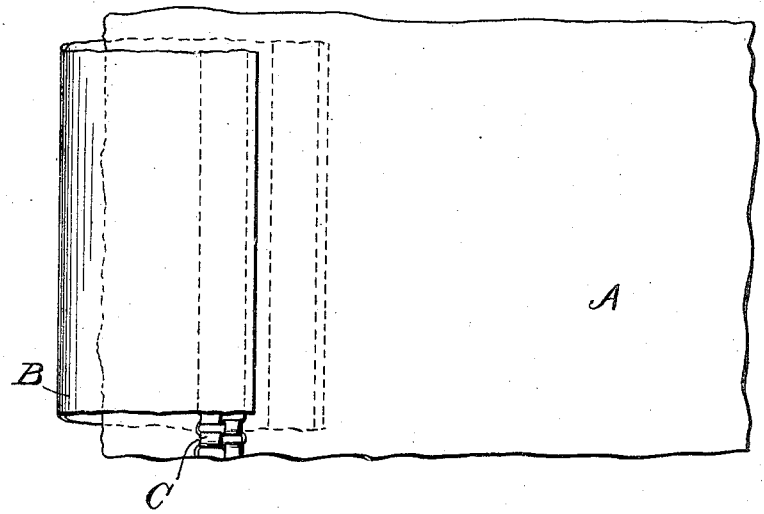
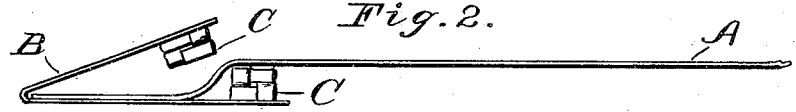
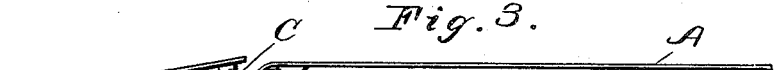
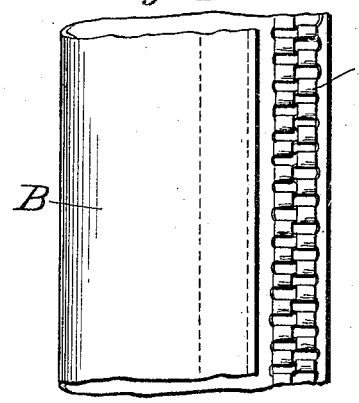
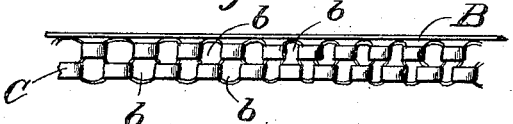
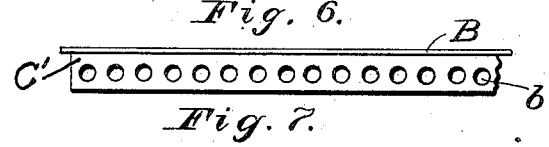
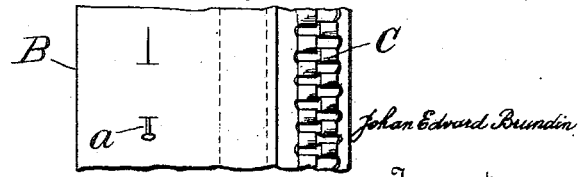
Witnesses
J. M. Howard
C. Sedgwick
Johan Edward Brundin
Inventor
By Ernst Lundgren
Attorney

UNITED STATES PATENT OFFICE.

JOHAN EDVARD BRUNDIN, OF NEW YORK, N. Y.

BEDBUG-TRAP.

No. 844,919.          Specification of Letters Patent.          Patented Feb. 19, 1907.

Application filed April 22, 1905. Renewed January 10, 1907. Serial No. 351,691.

*To all whom it may concern:*

Be it known that I, JOHAN EDVARD BRUNDIN, a citizen of the United States, residing at the borough of Brooklyn, city of New York, in the county of Kings and State of New York, have invented certain new and useful Improvements in Bedbug-Traps, of which the following, taken in connection with the accompanying drawings, is a full, clear, and exact specification.

This invention relates to that class of devices which are intended to be employed in connection with a bed or bedding for the purpose of trapping bedbugs and such like insects or vermin.

The principal object of my invention is to provide or produce a simple, cheap, and effective trap of the class above indicated which may be easily and quickly applied or set for the uses intended and which may be readily detached and emptied or discharged.

Subordinate objects are to make the trap so that it will not interfere with the ordinary use of the bedding, so that it will not detract from the appearance of the bedding, and so that it may be employed to protect the bed all around, if so desired.

To accomplish the foregoing objects and to secure other and further advantages in the matters of construction, application, operation, and use, my improvements involve certain new and useful peculiarities of construction and relative arrangements or combinations of parts, as will be herein first fully described and then pointed out in the claims.

In the accompanying drawings, forming part of this specification, Figure 1 is a plan view of a fragment of a sheet or other piece of bedding, showing a part of my improved form of trap applied thereto. Fig. 2 is an end view showing the upper and lower portions of the trap with the margin of the piece of bedclothing introduced between the two portions, as before the trap is secured in place. Fig. 3 is a similar view, but showing the two portions of the trap brought nearer together and ready to be finally secured in place. Fig. 4 is a plan view of a fragment of the trap detached from the bedding. Fig. 5 is a longitudinal elevation showing one manner of constructing and mounting the guards at the margins of the trap through which the openings are formed for the ingress of the bugs. Fig. 6 is a similar view showing another manner of constructing the marginal guards; and Fig. 7 is a plan view of a fragment, showing a trap pinned or otherwise secured in place.

In all these figures like letters of reference wherever they occur indicate corresponding parts.

A represents a sheet or other piece of bedclothing. B is the body of my improved trap, the same being made of any length and preferably of paper or fabric which may be easily bent or folded and easily secured in place in the desired manner This body is of width sufficient so that when doubled over to form the two parts of the trap it will embrace a sufficient margin of the piece of bedding and be easily and conveniently secured thereto by use of pins, as at *a*. On this flexible body are secured by gluing or any other substantial or convenient way the marginal strips or guards C C. These guards are so fashioned as to provide a number of small or narrow openings, as at *b b*, through which the bugs or vermin may enter the body of the trap. To make the guards light and easily applicable, at the same time slightly flexible, so that they will not when the trap is in place detract from the appearance of the bed, but will conform to its contour, I prefer to construct them of paper, and this is easily done by braiding together narrow strips of the paper, as indicated in Figs. 1 to 5. Such braided strips answer the desired purposes and are easily secured in place upon the body of the trap; but it is not essential that the guards be made of paper. They may be made of small and somewhat flexible strips of wood, as indicated at C' in Fig. 6, with suitable and numerous perforations or slits, or they may be of other material. The guards are applied near the margins of the body B, and when the trap is to be applied to the bedding the body is bent over, so that one of the guards will be located inside the other, as best indicated in Figs. 2 and 3. This affords an opportunity for properly compressing the trap so as to embrace the piece of bedding on the upper and under side. The bugs enter the trap from either side of the piece of bedding, and being once in the body of the trap they prefer to lodge there as in a secure retreat, rather than pass out again through the perforations in the guard.

To discharge the trap or empty it of its catch, it is only necessary to detach it from the bedding, open it slightly, and brush its contents out, when it will be ready for reapplication.

Being made after the manner above indicated, the trap is very simple and inexpensive, and after having been in use it may be entirely destroyed, if that method is preferred to cleaning it.

The flexible nature of the trap enables it to be employed on any part of the bedding without detracting from the appearance of the bed, so that it may be left in place as long as may be desired, and the bed may be used as usual when it is in place. By making the trap of sufficient length the four margins of any piece of bedding may be protected by it, if so desired, or any desired length of the trap may be applied to any piece of the bedding. The body, with the guard, is made of length sufficient so that it may be cut as may be required. If less than the entire margin of the piece of bedding is to be protected, then the ends of the trap should be secured by pinning or basting or stitching to prevent egress of the bugs or vermin at the otherwise open ends of the trap.

Being constructed and arranged substantially in accordance with the foregoing explanations, my improved device will be found to admirably answer all the purposes or objects of the invention hereinbefore alluded to.

Having now fully described my invention, what I claim as new herein, and desire to secure by Letters Patent, is—

1. In a trap of the character herein set forth, a flexible body portion having marginal guards with openings therethrough, the trap being arranged to be secured in place upon a piece of bedding, substantially in the manner and for the purposes explained.

2. In a trap of the character herein set forth, the combination with a flexible body of flexible guards applied thereto, said guards having openings therethrough, the trap being arranged to be applied to the bedding, substantially in the manner and for the purposes explained.

3. In a trap of the character herein set forth, a flexible body having marginal guards with openings applied on the body, the body being folded so as to bring one of the guards inside the other to embrace a piece of bedding, substantially in the manner and for the purposes set forth.

4. The combination with the piece of bedding of a folded trap-body, the latter having marginal guards with perforations therethrough, the guard on one margin being located within the guard on the other margin, and the body being secured to the bedding, substantially as and for the purposes set forth.

In testimony whereof I have signed my name to this specification in the presence of two subscribing witnesses.

JOHAN EDVARD BRUNDIN.

Witnesses:
C. SEDGWICK,
J. M. HOWARD.